United States Patent Office 3,130,043
Patented Apr. 21, 1964

3,130,043
RECOVERY OF NICKEL FROM LATERITE ORES
Lyall John Lichty, Phoenix, Ariz., assignor to Northfield Mines, Incorporated, a corporation of Delaware
No Drawing. Filed Mar. 17, 1961, Ser. No. 96,373
6 Claims. (Cl. 75—115)

This invention relates to the recovery of nickel from laterite ores. The invention is particularly directed to a process of leaching nickel from crushed laterite ores with a reagent comprising an acidulated sodium chloride brine.

The nickel content of most laterite ores is generally too low for economical metallurgical treatment. Yet, the availability of such ores renders the winning of metal values therefrom a very desirable objective and one toward which many processes have been developed, but in general have not proven economically feasible. It is therefore, an object of the present invention to provide a new process for the recovery of nickel from laterite ores.

I have found that when an acidulated sodium chloride brine is employed as a leaching reagent for the treatment of crushed laterite ores, the effluent leach liquor contains a surprising amount of nickel. Quite low salt and acid concentration in the brine are effective for producing leach liquor containing an adequate concentration of nickel for efficient and economical recovery. Leach liquor containing over 5 grams per liter of nickel are readily produced, and the recovery of nickel from such liquor by precipitation results in a precipitate having a nickel content as high as 30%. Thus a high grade nickel precipitate may economically and efficiently be recovered from a very low grade ore.

This invention contemplates a process for recovering nickel from laterite ores in which crushed ore is leached with an aqueous acidulated brine containing sodium chloride to obtain a leach liquor containing dissolved nickel. The leach liquor is separated from the ore and the nickel is then recovered from such leach liquor. The brine preferably contains 10 to 100 grams per liter of sodium chloride and has a pH of less than 2. It is advisable to acidulate the brine by the addition of from 2 to 50 grams per liter, of a mineral acid. It is further contemplated that the crushed laterite ore could be leached with acidulated sea water. Sea water is often available in the regions where laterite ores are found, and in some localities may be economically acidulated by introducing roasted pyrites into contact with it to lower the pH of the solution to less than 2.

The sodium chloride brine is preferably acidulated with sulfuric acid. The actual amount of sulfuric acid added to the brine is, of course, dependent upon several factors including the sodium chloride content of the brine and rate of dissolution of the nickel from the ore desired. Although larger amounts up to 50 grams per liter or even more of sulfuric acid may be added to the brine, there is no great advantage in using more than about 10 grams per liter. In most leaching operations substantially the full benefit of the presence of sulfuric acid for increasing the dissolving power of the brine for nickel may be achieved by adding about 0.5 to 1 percent by weight (5 to 10 grams per liter) of sulfuric acid.

The following specific example illustrates the applicability of recovering nickel from laterite ores by leaching with an acidulated sodium chloride brine. A nickel laterite ore after drying at a temperature of 100° C. had the following composition in percent by weight.

| | |
|---|---|
| Ni | 2.60 |
| Co | 0.05 |
| Mn | 0.20 |
| Cr | 1.25 |
| Fe | 13.50 |
| Al | 1.00 |
| Mg | 23.50 |
| Si | 38.70 |
| L.O.I.[1] | 12.40 |

[1] Loss on ignition.

The aggregate of crushed ore was mixed with sea water acidulated by the addition of 6 grams of sulfuric acid per liter of sea water. (In an alternative method the sea water was acidulated by mixing roasted iron pyrites with sea water.) After leaching the nickel laterite ore with the acidulated sea water, the resulting leach liquor was found to contain approximately 5 grams of nickel per liter, almost 10 grams of iron per liter, and small amounts of manganese and cobalt. The nickel was then separated from the leach liquor by precipitation. Several satisfactory ways of precipitating were successfully employed, among which the use of hydrogen sulfide, sodium sulfide and magnesia have proven especially satisfactory. In precipitating the leach liquor in the ways noted, precipitates containing 30 percent by weight of nickel were recovered. The leach liquor was found to contain a higher ratio of nickel to iron than is present in the ore and, during the first few weeks of operation, the liquor contains a much higher ratio of cobalt plus manganese to nickel than is present in the ore.

Although the foregoing tests demonstrate the effectiveness of employing minor amounts of sulfuric acid in a sodium chloride brine for the purpose of leaching nickel, similar advantages are attained by including many other acid compounds. Consequently, the invention of leaching nickel from finely divided laterite ore may be practiced with sodium chloride brine acidulated in any suitable manner.

I claim:
1. In a process for recovering nickel from laterite ore in which the ore in a crushed state is leached, the resulting leach solution containing dissolved nickel which is separated from the ore residue, and in which nickel is recovered from the separated leach solution the improvement comprising using only a leach solution consisting essentially of an aqueous sodium chloride solution having a sodium chloride content in the range from 10 to 100 grams per liter and acidulated with sulfuric acid to a pH less than 2.

2. A process according to claim 1, in which the leach solution is acidulated with 2 to 50 grams per liter of sulfuric acid.

3. A process according to claim 2, in which the sodium chloride content of the leach solution is in the range from 20 to 50 grams per liter and said solution is acidulated with from 5 to 10 grams per liter of sulfuric acid.

4. A process according to claim 2, in which the residual leach liquor after recovery of the nickel is returned for leaching a further quantity of the crushed ore.

5. A process according to claim 1, in which the leach solution is acidulated sea water.

6. A process according to claim 5, in which the sea water is acidulated by introducing roasted pyrites into contact therewith.

References Cited in the file of this patent
UNITED STATES PATENTS

| 514,041 | Schwahn | Feb. 6, 1894 |
| 732,641 | Joseph | June 30, 1903 |
| 1,084,600 | Best | Jan. 20, 1914 |
| 2,105,456 | Hubler et al. | Jan. 11, 1938 |

OTHER REFERENCES

Parkes and Mellor, "Mellor's Modern Inorganic Chemistry," Longmans, Green & Co., New York, 1939, page 817.